(12) United States Patent
Karabed et al.

(10) Patent No.: US 6,408,419 B1
(45) Date of Patent: Jun. 18, 2002

(54) TRELLIS CODE FOR EXTENDED PARTIAL RESPONSE MAXIMUM LIKELIHOOD (EPRML) CHANNEL

(75) Inventors: Razmik Karabed, San Jose; Jonathan J. Ashley, Los Gatos, both of CA (US); James Wilson Rae, Rochester, MN (US)

(73) Assignee: Infineon Technologies North America Corp., San Jose, CA (US)

( * ) Notice: Subject to any disclaimer, the term of this patent is extended or adjusted under 35 U.S.C. 154(b) by 0 days.

(21) Appl. No.: 09/347,598

(22) Filed: Jul. 1, 1999

(51) Int. Cl.[7] .............................................. H03M 13/00
(52) U.S. Cl. ...................................... 714/792; 375/265
(58) Field of Search ................................ 712/792, 795; 375/265

(56) References Cited

U.S. PATENT DOCUMENTS

| | | | |
|---|---|---|---|
| 4,077,021 A | 2/1978 | Csajka et al. ............... 332/103 |
| 4,673,891 A | 6/1987 | Remy ............................ 331/2 |
| 4,707,681 A | * 11/1987 | Eggenberger et al. ........ 341/59 |
| 4,802,009 A | 1/1989 | Hartmeier .................... 348/537 |
| 4,873,701 A | 10/1989 | Tretter ......................... 375/245 |
| 4,888,775 A | 12/1989 | Karabed et al. ............. 714/755 |
| 4,888,779 A | 12/1989 | Karabed et al. ............. 714/792 |
| 4,939,555 A | 7/1990 | Calderbank et al. ........ 375/286 |
| 5,040,191 A | 8/1991 | Forney, Jr. et al. ......... 375/263 |
| 5,052,031 A | 9/1991 | Molloy ........................ 375/376 |
| 5,095,484 A | 3/1992 | Karabed et al. ............. 714/746 |
| 5,111,483 A | 5/1992 | Serfaty ........................ 375/341 |
| 5,159,610 A | 10/1992 | Eyuboglu et al. ........... 375/270 |
| 5,181,209 A | 1/1993 | Hagenauer et al. ......... 714/795 |
| 5,214,672 A | 5/1993 | Eyuboglu et al. ........... 375/254 |
| 5,260,703 A | 11/1993 | Nguyen et al. .............. 341/100 |
| 5,301,209 A | 4/1994 | Wei .............................. 375/265 |
| 5,327,440 A | 7/1994 | Fredrickson et al. ........ 714/795 |
| 5,424,881 A | 6/1995 | Behrens et al. .............. 360/40 |
| 5,490,091 A | 2/1996 | Kogan et al. ................ 702/180 |
| 5,497,384 A | 3/1996 | Fredrickson et al. ........ 714/792 |
| 5,619,539 A | 4/1997 | Coker et al. ................. 375/341 |
| 5,689,532 A | 11/1997 | Fitzpatrick .................. 375/341 |
| 5,691,993 A | 11/1997 | Fredrickson ................. 714/761 |
| 5,726,818 A | 3/1998 | Reed et al. .................... 360/51 |
| 5,757,294 A | 5/1998 | Fisher et al. .................. 341/57 |
| 5,771,127 A | 6/1998 | Reed et al. .................... 360/51 |
| 5,809,080 A | 9/1998 | Karabed et al. ............. 375/263 |
| 5,809,081 A | 9/1998 | Karabed et al. ............. 375/263 |
| 5,812,334 A | 9/1998 | Behrens et al. .............. 360/40 |
| 5,841,818 A | 11/1998 | Lin et al. ..................... 375/341 |
| 5,844,738 A | 12/1998 | Behrens et al. .............. 360/44 |
| 5,844,741 A | 12/1998 | Yamakawa et al. ........... 360/65 |
| 5,844,922 A | 12/1998 | Wolf et al. .................. 714/786 |
| 5,857,002 A | 1/1999 | Melas .......................... 375/290 |
| 6,035,435 A | * 3/2000 | Shih et al. ................... 714/795 |
| 6,154,870 A | * 11/2000 | Fredrickson et al. ........ 714/786 |

OTHER PUBLICATIONS

McLaughlin et al., One-pairs coded for partial response magnetic recording, IEEE, pp. 2080–2086, May 1999.*

Tzuwang et al., A trellis coded E2PRML digital read–write channel IC, IEEE, pp. 36–38, Feb. 1999.*

Nishiya et al. Turbo EPRML: An EPRML4 channel with an error-correcting post-processor designed for 16/17 rate quasi-MTR code, IEEE, pp. 2706–2711, 1998.*

Chern et al., An EPRML digital read/write channel IC, IEEE, pp. 320–322, 1997.*

* cited by examiner

Primary Examiner—Albert Decady
Assistant Examiner—Shelly A Chase
(74) Attorney, Agent, or Firm—Fish & Richardson P.C.

(57) ABSTRACT

A first trellis code (12A, 20A) according to the present invention is a rate 24/26 trellis code with three (3) bytes error propagation due to EPRML minimum instance channel errors, a minimum of six (6) transitions per code word and a maximum of twelve (12) consecutive zeroes. A second trellis code (12B, 20B) according to the present invention is a rate 48/51 trellis code, derived from the first trellis code. The second trellis code has four (4) bytes error propagation due to EPRML minimum distance channel errors, a minimum of twelve (12) transitions per code word and a maximum of twelve (12) consecutive zeroes. A third trellis code (12C, 20C) according to the present invention is a rate 48/51 trellis code with four (4) bytes error propagation due to EPRML minimum distance channel errors, a minimum of fourteen (14) transitions per code word and a maximum of eleven (11) consecutive zeroes.

10 Claims, 14 Drawing Sheets

M1 maps 12 bits, a=(a1--a12), to 11 bits, (b1--b11), as follows:

|   |   | b1 | b2 | b3 | b4 | b5 | b6 | b7 | b8 | b9 | b10 | b11 |
|---|---|----|----|----|----|----|----|----|----|----|-----|-----|
|   | G | a1 | a2 | a3 | a4 | a5 | a6 | a7 | a8 | a9 | a10 | a11 |
| 1 |   | a1 | a2 | a3 | a4 | a5 | a6 | a7 | a8 | a9 | a10 | a11 |
| 2 | B1 ∩ R1' ∩ R2' ∩ R3' | 1 | 0 | 1 | a2 | a4 | a6 | a7 | a8 | a9 | a10 | a12 |
| 3 | B1 ∩ R1 | 1 | 0 | 1 | 0 | a1 | a4 | a8 | a9 | a10 | a11 | a12 |
| 4 | B1 ∩ R2 | 1 | 0 | 1 | 1 | 0 | a4 | a8 | a9 | a10 | a11 | a12 |
| 5 | B1 ∩ R3 | 0 | 1 | 0 | a2 | 1 | a1 | a8 | a9 | a10 | a11 | a12 |
| 6 | B2 | 1 | 0 | 0 | 1 | 0 | a6 | a8 | a9 | a10 | a11 | a12 |
| 7 | B3 ∩ {a2=0} | 1 | 0 | 0 | 0 | 1 | a1 | a8 | a9 | a10 | a11 | a12 |
| 8 | B3 ∩ {a2=1} ∩ {a1=a7=a8=a9=a10=a11=a12=0} | | | | | | | | | | | a12 |
| 9 | B3 ∩ {a2=1} ∩ {a1=a7=a8=a9=a10=a11=a12=0}' | 1 | 1 | 0 | 0 | 1 | 0 | 1 | a9 | a10 | a11 | a12 |
| 10 | B4 ∩ {a1+a2+a3+a4+a5+a6+a7+a8=1} | 1 | 1 | 0 | 1 | m1 | m2 | m3 | a9 | a10 | a11 | a12 |
| 11 | B4 ∩ {a1+a2+a3+a4+a5+a6+a7+a8=0} | 1 | 1 | 0 | 0 | 0 | 1 | 1 | | | | |

Where (m1 m2 m3) is m1 = a2 ∨ a4 ∨ a6 ∨ a8
m2 = a3 ∨ a4 ∨ a7 ∨ a8
m3 = a5 ∨ a6 ∨ a7 ∨ a8

FIG. 3

M2 maps 12 bits, a=(a1---a12), to 10 bits, (v1---v10), as follows:

| | GG | v1<br>a3 | v2<br>a4 | v3<br>a5 | v4<br>a6 | v5<br>a7 | v6<br>a8 | v7<br>a9 | v8<br>a10 | v9<br>a11 | v10<br>a12 |
|---|---|---|---|---|---|---|---|---|---|---|---|
| 1 |  | a1 | 0 | 1 | a2 | a3 | a5 | a9 | a10 | a11 | a12 |
| 2 | D1 ∩ {a1=0, a2=1, a3=a5, a7=a9}' | 1 | 0 | 0 | a2 | a3 | a5 | a7 | a9 | a11 | a12 |
| 3 | D1 ∩ {a1=0, a2=1, a3=a5, a7=a9} | 1 | 0 | 0 | 0 | 1 | 1 | a7 | a7 | a11 | a12 |
| 4 | D2 ∩ T1 | 1 | 0 | 0 | 1 | 0 | 1 | a3 | a7 | a11 | a12 |
| 5 | D2 ∩ T2 ∩ T3 ∩ T1' | 0 | 0 | 0 | 0 | 1 | 1 | a3 | a7 | a11 | a12 |
| 6 | D2 ∩ T2 ∩ T3' ∩ T1' | 1 | 0 | 0 | 1 | 1 | 0 | 1 | a1 | a7 | a11 | a12 |
| 7 | D2 ∩ T4 ∩ T1' ∩ T2' | 1 | 1 | 1 | 1 | 1 | a1 | a3 | a7 | a11 | a12 |
| 8 | D2 ∩ T1' ∩ T2' ∩ T4' | a1 | 0 | 1 | a2 | a3 | a5 | a7 | a9 | a11 | a12 |
| 9 | D3 ∩ {a1=0,a2=0,a11=0,a12=0}' | 0 | 0 | 0 | 1 | 0 | 1 | a1 | a2 | a11 | a12 |
| 10 | D3 ∩ {a1=0,a2=0,a11=0,a12=0} | 1 | 1 | 0 | 1 | 1 | 0 | 1 | 1 | 1 | 0 |
| 11 | D4 ∩ {a1+...+a12=0} | 0 | 0 | 0 | 0 | 1 | 0 | 1 | 1 | 0 | 1 |
| 12 | D4 ∩ {a1+...+a12=1 or 2} | c1 | 1 | 0 | c2 | c3 | c4 | w1 | w2 | w3 | w4 |
| 13 | D5 ∩ {a1=0,a2=a3} | 1 | 0 | 0 | 1 | 0 | 0 | 0 | a2 | a4 | a5 |
| 14 | D5 ∩ {a1=a2,a3=a4} ∩ {a1=0,a2=a3}' | 1 | 0 | 0 | 1 | 0 | 1 | 1 | a1 | a4 | a5 |
| 15 | D5 ∩ {a1=a2,a3=a4}' ∩ {a1=0,a2=a3}' | 0 | 0 | 0 | 0 | 0 | a1 | a2 | a3 | a4 | a5 | h1 = a1
h2 = a1' ∧ a2
h3 = a1' ∧ a2' ∧ a3
h4 = a1' ∧ a2' ∧ a3' ∧ a4
h5 = a1' ∧ a2' ∧ a3' ∧ a4' ∧ a5
h6 = a1' ∧ a2' ∧ a3' ∧ a4' ∧ a5' ∧ a6
h7 = a1' ∧ a2' ∧ a3' ∧ a4' ∧ a5' ∧ a6' ∧ a7
h8 = a1' ∧ a2' ∧ a3' ∧ a4' ∧ a5' ∧ a6' ∧ a7' ∧ a8
h9 = a1' ∧ a2' ∧ a3' ∧ a4' ∧ a5' ∧ a6' ∧ a7' ∧ a8' ∧ a9
h10= a1' ∧ a2' ∧ a3' ∧ a4' ∧ a5' ∧ a6' ∧ a7' ∧ a8' ∧ a9' ∧ a10
h11= a1' ∧ a2' ∧ a3' ∧ a4' ∧ a5' ∧ a6' ∧ a7' ∧ a8' ∧ a9' ∧ a10' ∧ a11
h12= a1' ∧ a2' ∧ a3' ∧ a4' ∧ a5' ∧ a6' ∧ a7' ∧ a8' ∧ a9' ∧ a10' ∧ a11' ∧ a12

FIG. 4A

```
cc1=h1 V h3 V h5   V h7    V h9    V h11
cc2=h2 V h3 V h6   V h7    V h10 V h11
cc3=h4 V h5 V h6   V h7    V h12
cc4=h8 V h9 V h10 V h11 V h12 c1c2c3c4 = (cc1 cc2 cc3 cc4)
if c1 c2 c3 c4 = 1110 then let c1c2c3c4 = 1111
if c1 c2 c3 c4 = 1000 then let c1c2c3c4 = 0111 hh1   = a12
hh2   = a11' ∧ a12'
hh3   = a10' ∧ a11' ∧ a12'
hh4   = a9'  ∧ a10' ∧ a11' ∧ a12'
hh5   = a8'  ∧ a9'  ∧ a10' ∧ a11' ∧ a12'
hh6   = a7'  ∧ a8'  ∧ a9'  ∧ a10' ∧ a11' ∧ a12'
hh7   = a6'  ∧ a7'  ∧ a8'  ∧ a9'  ∧ a10' ∧ a11' ∧ a12'
hh8   = a5'  ∧ a6'  ∧ a7'  ∧ a8'  ∧ a9'  ∧ a10' ∧ a11' ∧ a12'
hh9   = a4'  ∧ a5'  ∧ a6'  ∧ a7'  ∧ a8'  ∧ a9'  ∧ a10' ∧ a11' ∧ a12'
hh10= a3'  ∧ a4'  ∧ a5'  ∧ a6'  ∧ a7'  ∧ a8'  ∧ a9'  ∧ a10' ∧ a11' ∧ a12'
hh11= a2'  ∧ a3'  ∧ a4'  ∧ a5'  ∧ a6'  ∧ a7'  ∧ a8'  ∧ a9'  ∧ a10' ∧ a11' ∧ a12'
hh12= a1'  ∧ a2'  ∧ a3'  ∧ a4'  ∧ a5'  ∧ a6'  ∧ a7'  ∧ a8'  ∧ a9'  ∧ a10' ∧ a11' ∧ a12' w4 = hh1 V hh3 V hh5   V hh7    V hh9    V hh11
w3 = hh2 V hh3 V hh6   V hh7    V hh10 V hh11
w2 = hh4 V hh5 V hh6   V hh7    V hh12
w1 = hh8 V hh9 V hh10 V hh11 V hh12
```

FIG. 4B

MAP MM1

MM1 maps 11 bits, (b1---b11), to 12 bits, a=(a1---a12), as follows:

|   |   |   |   |   | a1 | a2 | a3 | a4 | a5 | a6 | a7 | a8 | a9 | a10 | a11 | a12 |
|---|---|---|---|---|----|----|----|----|----|----|----|----|----|-----|-----|-----|
| 1 | b2=1 | b3=1 |       |       | b1 | b4 | b4 | b5 | b5 | b6 | b6 | b7 | b8 | b9  | b10 | b11 |
| 2 | b1=1 | b2=0 | b3=1 | b4=0 | b5 | b6 | b6 | b6 | b6 | b7 | b7 | b7 | b8 | b9  | b10 | b11 |
| 3 | b1=1 | b2=0 | b3=1 | b4=1 | b5=0 | 1 | 1 | 1 | b6 | b6 | b6 | b6 | b7 | b8 | b9 | b10 | b11 |
| 4 | b1=1 | b2=0 | b3=1 | b4=1 | b5=1 | b6 | 1 | 1 | b6 | b5 | b6 | b7 | b7 | b8 | b9 | b10 | b11 |
| 5 | b1=0 | b2=1 | b3=0 |      | b4 | b4 | b5 | b5 | b6 | b6 | b7 | b7 | b8 | b9  | b10 | b11 |
| 6 | b1=1 | b2=0 | b3=0 | b4=1 | b5=0 | b6 | 0 | 1 | 0 | 0 | 0 | 1 | 0 | b8 | b9 | b10 | b11 |
| 7 | b1=1 | b2=0 | b3=0 | b4=0 | b5=1 | b6 | 1 | 1 | 1 | 1 | 1 | 0 | 0 | b8 | b9 | b10 | b11 |
| 8 | b1=1 | b2=1 | b3=0 | b4=0 | b5=1 | 0 | 0 | 0 | 0 | 0 | 0 | 0 | b8 | b9 | b10 | b11 |
| 9 | b1=1 | b2=1 | b3=0 | b4=0 | b5=0 | 0 | 0 | 0 | 0 | 0 | 0 | 0 | b8 | b9 | b10 | b11 |
| 10 | b1=1 | b2=1 | b3=0 | b4=1 |     | I1 | I2 | I3 | I4 | I5 | I6 | I7 | I8 | b8 | b9 | b10 | b11 | where (I1...I8) is

MAP MM2
MM2 maps 10 bits, (v1---v10), to 12 bits, a=(a1---a12), as follows:

| | | a1 | a2 | a3 | A4 | a5 | a6 | a7 | a8 | a9 | a10 | a11 | a12 |
|---|---|---|---|---|---|---|---|---|---|---|---|---|---|
| 1 | v2=0,v3=1 | v1 | v4 | v5 | v6 | v6 | v7 | v7 | v8 | v8 | v9 | v9 | v10 |
| 2 | v1=1,v2=0,v3=0,v4=0,v5=1 v6=1 | 0 | 1 | v7 | v7 | v7 | v8 | v8 | v8 | v8 | v9 | v9 | v10 |
| 3 | v1=1,v2=0,v3=0,v4=1,v5=1 v6=1 | 1 | 1 | v7 | v7 | v7 | v7 | v8 | v8 | v8 | v9 | v9 | v10 |
| 4 | v1=0,v2=0,v3=0,v4=0,v5=1 | v8 | v8 | v8 | v8 | v9 | v9 | v9 | v8 | v8 | v9 | v9 | v10 |
| 5 | v1=1,v2=0,v3=0,v4=0,v5=1 | v6 | v7 | v7 | v7 | v8 | v8 | v8 | v8 | v9 | v9 | v9 | v10 |
| 6 | v1=1,v2=0,v3=0,v4=1,v5=1 v6=0 | 0 | 1 | v8 | 1 | 1 | 1 | 1 | 1 | 1 | 1 | 0 | v10 |
| 7 | v2=1,v3=1 | v1 | v4 | v5 | v5 | v6 | v6 | v7 | v7 | v8 | v8 | v9 | v10 |
| 8 | v1=0,v2=1,v3=0,v4=1,v5=0 | v7 | v8 | v9 | v9' | v9' | v9' | v9' | v9' | v9' | v9' | v9' | v10 |
| 9 | v1=1,v2=1,v3=0,v4=1,v5=1 v6=0 | 0 | 0 | 0 | 1 | 0 | 0 | 0 | 1 | 1 | 1 | 0 | 0 |
| 10 | v1=0,v2=0,v3=0,v4=1,v5=1 | 0 | 0 | 0 | 0 | 0 | 0 | 0 | 0 | 0 | 0 | 0 | 0 |
| 11 | v2=1,v3=0 & (v1v4v5v6 ≠1110) | r1 | r2 | r3 | r4 | r5 | r6 | r7 | r8 | r9 | r10 | r11 | r12 |
| 12 | v1=1,v2=0,v3=0,v4=1,v5=0 v6=0 v7=0 | 0 | v8 | v8 | v9 | v10 | 0 | 0 | 0 | 0 | 0 | 0 | 0 |
| 13 | v1=1,v2=0,v3=0,v4=1,v5=0 v6=0 v7=1 | v8 | v8 | v9 | v9 | v10 | 0 | 0 | 0 | 0 | 0 | 0 | 0 |
| 14 | v1=0,v2=0,v3=0,v4=0,v5=0 | v6 | v7 | v8 | v9 | v10 | 0 | 0 | 0 | 0 | 0 | 0 | 0 |

Let p1p2p3p4 = v1v4v5v6
if p1p2p3p4 = 1111   then p1p2p3p4=1110
if p1p2p3p4 = 0111   then p1p2p3p4=1000
w4w3w2w1 = v7v8v9v10
q4q3q2q1 = (1101) − (binary subtraction) w4w3w2w1 r1= (P4' < p3' < p2' < p1') ∨ (q4' < q3' < q2' < q1')
r2= (P4' < p3' < p2' < p1 ) ∨ (q4' < q3' < q2' < q1')
r3= (P4' < p3' < p2 < p1') ∨ (q4' < q3' < q2 < q1')
r4= (P4' < p3' < p2 < p1 ) ∨ (q4' < q3' < q2 < q1')
r5= (P4' < p3 < p2' < p1') ∨ (q4' < q3 < q2' < q1')
r6= (P4' < p3 < p2' < p1 ) ∨ (q4' < q3 < q2' < q1')
r7= (P4' < p3 < p2 < p1') ∨ (q4' < q3 < q2 < q1')
r8= (P4' < p3 < p2 < p1 ) ∨ (q4' < q3 < q2 < q1')
r9= (P4 < p3' < p2' < p1') ∨ (q4 < q3' < q2' < q1')
r10= (P4 < p3' < p2' < p1 ) ∨ (q4 < q3' < q2' < q1')
r11= (P4 < p3' < p2 < p1') ∨ (q4 < q3' < q2 < q1')
r12= (P4 < p3' < p2 < p1 ) ∨ (q4 < q3' < q2 < q1')

FIG. 6

The following table describes map F.
Let $A1=(a_11\ a_12....a_112)$ and $A2=(a_21\ a_22...a_212)$.

|  | $b_11\ b_12..b_111$ | $b_112$ | $e1$ | $b_21$ | $b_22$ | $b_23\ b_24...b_212$ |
|---|---|---|---|---|---|---|
| A1 in G & A2 in GG | M1(A1) | $a_112$ | 1 | $a_21$ | $a_22$ | M2(A2) |
| A1 in B & A2 in GG | M1(A1) | 1 | 0 | $a_21$ | $a_22$ | M2(A2) |
| A1 in G & A2 in D | M1(A1) | 0 | 0 | 1 | $a_112$ | M2(A2) |
| A1 in B & A2 in D | M1(A1) | 0 | 0 | 0 | 1 | M2(A2) |

FIG. 7

The following table describes map FF.

|  | $a_11\ a_12....a_110$ | $a_111$ | $a_112$ | $a_21$ | $a_22$ | $a_23\ a_24...a_212$ |
|---|---|---|---|---|---|---|
| $e1=1$ | $b_11\ b_12....b_110$ | $b_111$ | $b_112$ | $b_21$ | $b_22$ | $b_23\ b_24...b_212$ |
| $b_112=1\ e_1=0$ | $w_11\ w_12....w_110$ | $w_111$ | $w_112$ | $b_21$ | $b_22$ | $b_23\ b_24...b_212$ |
| $b_112=0\ e_1=0\ b_21=1$ | $b_11\ b_12....b_110$ | $b_111$ | $b_22$ | $w_21$ | $w_22$ | $w_23\ w_24...w_212$ |
| $b_112=0\ e_1=0\ b_21=0$ | $w_11\ w_12....w_110$ | $w_111$ | $w_112$ | $w_21$ | $w_22$ | $w_23\ w_24...w_212$ | where
$(w_11\ w_12....w_112) = MM1(b_11\ b_12....b_111)$
$(w_21\ w_22....w_212) = MM2(b_23\ b_24....b_212)$.

FIG. 8

M3 maps 12 bits, a=(a1---a12), to 10 bits, (b1---b10), as follows:

|    |                                      | b1  | b2  | b3 | b4 | b5 | b6 | b7 | b8  | b9  | b10 |
|----|--------------------------------------|-----|-----|----|----|----|----|----|-----|-----|-----|
| 1  | G                                    | a1  | a2  | a3 | a4 | a5 | a6 | a7 | a8  | a9  | a10 |
| 2  | B1 ∩ {a10=a11}                       | a1  | a2  | 0  | 1  | 0  | a4 | a6 | a8  | a9  | a12 |
| 3  | B1 ∩ {a10≠a11} ∩ {a2=0, a4=a6}'      | 1   | a2  | 0  | 1  | 1  | a4 | a6 | a8  | a10 | a12 |
| 4  | B1 ∩ {a10≠a11} ∩ {a2=0, a4=a6}       | 1   | 0   | 1  | 0  | 0  | a4 | a1 | a8  | a10 | a12 |
| 5  | B2 ∩ {a11=a12} ∩ {a3=1, a5=a7}'      | a1  | a2  | 0  | 0  | 1  | a3 | a5 | a7  | a9  | a11 |
| 6  | B2 ∩ {a11≠a12}                       | a1  | a2  | 1  | 0  | 1  | a3 | a5 | a7  | a9  | a11 |
| 7  | B2 ∩ {a11=a12} ∩ {a3=1, a5=a7}       | a1  | 1   | 0  | 1  | 0  | 1  | a5 | a2  | a9  | a11 |
| 8  | B3                                   | a1  | a2  | 1  | 1  | 1  | 1  | 0  | 1   | a11 | a12 |
| 9  | B4 ∩ {a1+...+a8>=1}                  | m1  | m2  | 1  | 1  | m3 | m4 | m5 | m6  | m7  | m8  |
| 10 | B4 ∩ {a1+...+a8>=1}'                 | a9  | 0   | 1  | 0  | 1  | 0  | 0  | a10 | a11 | a12 |
| 11 | B5                                   | 0   | a7' | 1  | 0  | 0  | a8 | a9 | a10 | a11 | a12 |

Where (m1...m8) is defined below.

hh1 = a1  
hh2 = a1' < a2  
hh3 = a1' < a2' < a3  
hh4 = a1' < a2' < a3' < a4  
hh5 = a1' < a2' < a3' < a4' < a5  
hh6 = a1' < a2' < a3' < a4' < a5' < a6  
hh7 = a1' < a2' < a3' < a4' < a5' < a6' < a7  
hh8 = a1' < a2' < a3' < a4' < a5' < a6' < a7' < a8 u1 = hh2 ∨ hh4 ∨ hh6 ∨ hh8  
u2 = hh3 ∨ hh4 ∨ hh7 ∨ hh8  
u3 = hh5 ∨ hh6 ∨ hh7 ∨ hh8

FIG. 11A h1 = a12  
h2 = a11 ∧ a12'  
h3 = a10 ∧ a11' ∧ a12'  
h4 = a9 ∧ a10' ∧ a11' ∧ a12'  
h5 = a8 ∧ a9' ∧ a10' ∧ a11' ∧ a12'  
h6 = a7 ∧ a8' ∧ a9' ∧ a10' ∧ a11' ∧ a12'  
h7 = a6 ∧ a7' ∧ a8' ∧ a9' ∧ a10' ∧ a11' ∧ a12'  
h8 = a5 ∧ a6' ∧ a7' ∧ a8' ∧ a9' ∧ a10' ∧ a11' ∧ a12'  
h9 = a4 ∧ a5' ∧ a6' ∧ a7' ∧ a8' ∧ a9' ∧ a10' ∧ a11' ∧ a12'  
h10= a3 ∧ a4' ∧ a5' ∧ a6' ∧ a7' ∧ a8' ∧ a9' ∧ a10' ∧ a11' ∧ a12'  
h11= a2 ∧ a3' ∧ a4' ∧ a5' ∧ a6' ∧ a7' ∧ a8' ∧ a9' ∧ a10' ∧ a11' ∧ a12'  
h12= a1 ∧ a2' ∧ a3' ∧ a4' ∧ a5' ∧ a6' ∧ a7' ∧ a8' ∧ a9' ∧ a10' ∧ a11' ∧ a12' k1=h1 V h3 V h5 V h7 V h9 V h11  
k2=h2 V h3 V h6 V h7 V h10 V h11  
k3=h4 V h5 V h6 V h7 V h12  
k4=h8 V h9 V h10 V h11 V h12 if {u1=0 AND k3=k4}'   (m1 m2 m3 m4 m5 m6 m7 m8) = (u3 u2 0 u1 k4 k3 k2 k1)  
if {u1=0 AND k3=k4}    (m1 m2 m3 m4 m5 m6 m7 m8) = (u3 u2 1 0  1  k3 k2 k1)

FIG. 11B

MAP MM
MM maps 10 bits, (b1--b10), to 12 bits, a=(a1--a12), as follows:

|   |              | a1  | a2  | a3  | a4  | a5  | a6  | a7  | a8  | a9  | a10 | a11 | a12 |
|---|--------------|-----|-----|-----|-----|-----|-----|-----|-----|-----|-----|-----|-----|
| 1 | b3b4b5=010   | b1  | b2  | b2  | b6  | b6  | b7  | b7  | b8  | b8  | b9  | b9  | b10 |
| 2 | b3b4b5=011   | b1  | b2  | b2  | b6  | b6  | b7  | b7  | b8  | b8  | b9  | b9' | b10 |
| 3 | b1b3b4b5=1100| b7  | 0   | 0   | b6  | b6  | b6  | b6  | b6  | b7  | b9  | b9' | b10 |
| 4 | b1b3b4b5=0100| 0   | 0   | 0   | 0   | 0   | 0   | b2' | b6  | b7  | b8  | b9  | b10 |
| 5 | b3b4b5=001   | b1  | b2  | b6  | b6  | b7  | b7  | b8  | b8  | b9  | b9  | b9  | b10 |
| 6 | b3b4b5=101   | b1  | b2  | b6  | b6  | b7  | b7  | b8  | b8  | b9  | b9  | b10 | b10'|
| 7 | b3b4b5=000   | b1  | b8  | 1   | 1   | b7  | b7  | b7  | b7  | b9  | b9  | b10 | b10 |
| 8 | b3b4b5=110   | t1  | t2  | t3  | t4  | t5  | t6  | t7  | t8  | t9  | t10 | t11 | t12 |
| 9 | b3b4b5b6b7=11101 | tt1 | tt2 | tt3 | tt4 | tt5 | tt6 | tt7 | tt8 | tt9 | tt10| tt11| tt12|
| 10| b3b4b5b6b7=11100 | 0   | 0   | 0   | 0   | 0   | 0   | 0   | 0   | b1  | b8  | b9  | b10 |
| 11| b3b4b5b6=1111 | b1  | b2  | b2' | b2' | b2' | b2' | b2' | b2' | b2' | b2' | b9  | b10 |

Where
bb=b7
t1 = (b1' < b2' < b6') > (bb < b8 < b9' < b10')
t2 = (b1' < b2 < b6') > (bb < b8' < b9 < b10)
t3 = (b1' < b2 < b6') > (bb < b8' < b9' < b10')
t4 = (b1' < b2 < b6') > (bb < b8' < b9' < b10)
t5 = (b1 < b2' < b6') > (bb < b8 < b9' < b10')
t6 = (b1 < b2 < b6') > (bb < b8 < b9' < b10')
t7 = (b1 < b2' < b6') > (bb'< b8 < b9' < b10')
t8 = (b1 < b2 < b6') > (bb'< b8 < b9' < b10)
t9 = (bb'< b8' < b9 < b10')
t10 = (bb'< b8' < b9 < b10)
t11 = (bb'< b8' < b9' < b10')
t12 = (bb'< b8' < b9' < b10)

The following table describes map F. Let
$A1=(a_11\ a_12....a_112)$ and $A2=(a_21\ a_22...a_212)$.

| | $b_11\ b_12..b_110$ | $b_111$ | $b_112$ | e1 | $b_21$ | $b_22$ | $b_23\ b_24...b_212$ |
|---|---|---|---|---|---|---|---|
| A1 in G ∧ A2 in G | M(A1) | $a_111$ | $a_112$ | 1 | $a_21$ | $a_22$ | R2(M(R1(A2))) |
| A1 in B ∧ A2 in G | M(A1) | $a_21$ | 0 | 0 | 1 | $a_22$ | R2(M(R1(A2))) |
| A1 in G ∧ A2 in B | M(A1) | $a_111$ | 1 | 0 | 0 | $a_112$ | R2(M(R1(A2))) |
| A1 in B ∧ A2 in B | M(A1) | 1 | 1 | 0 | 1 | 1 | R2(M(R1(A2))) |

Where maps R1 and R2, reverse the order of the coordinates:

$R1(A2)=R1(a_21\ a_22...a_212)=(a_212\ a_211...a_21)$, and
$R2(x1\ x2\ ...\ x9\ x10) = (x10\ x9\ ...\ x2\ x1)$.

R1 works on 12-bit vectors, while R2 works on 10-bit vectors.

FIG. 13

The following table describes map FF.

| | $a_11\ a_12....a_110$ | $a_111$ | $a_112$ | $a_21$ | $a_22$ | $a_23\ a_22...a_212$ |
|---|---|---|---|---|---|---|
| e1=1 | $b_11\ b_12....b_110$ | $b_111$ | $b_112$ | $b_21$ | $b_22$ | $b_23\ b_24...b_212$ |
| e1=0 $b_112b_21 = 01$ | q1 q2....q10 | q11 | q12 | $b_111$ | $b_22$ | $b_23\ b_24...b_212$ |
| e1=0 $b_112b_21 = 10$ | $b_11\ b_12....b_110$ | $b_111$ | $b_22$ | p1 | p2 | p3p4...p12 |
| e1=0 $b_112b_21 = 11$ | q1 q2....q10 | q11 | q12 | p1 | p2 | p3p4...p12 | where
q1q2...q12 = MM($b_11\ b_12....b_110$), and
p1p2...p12 = R1(MM(R2($b_23\ b_24...b_212$))).

FIG. 14

TRELLIS CODE FOR EXTENDED PARTIAL RESPONSE MAXIMUM LIKELIHOOD (EPRML) CHANNEL

BACKGROUND OF THE INVENTION

1. Field of the Invention

The present invention relates to encoding for disk drives and, particularly, to an improved trellis code for an extended partial response with maximum likelihood (EPRML) channel.

2. Description of the Related Art

In order to achieve higher recording densities, designers of magnetic recording channels have switched from analog peak detection techniques to sampled data detection techniques. In sampled data detection systems, the readback signal is filtered and sampled at a channel rate of 1/T, where T is the duration of a channel symbol. One such technique is referred to as extended partial response maximum likelihood (EPRML). The discrete time transfer function of an extended partial response channel is $(1+D-D^2-D^3)$, where D represents a unit time delay operator with unit-time T. Thus, the noiseless output of the extended partial response channel is equal to the input signal minus a version of the input signal delayed in time by 2T, minus a version of the input signal delayed in time by 3T and plus a version of the input signal forward in time by T. In an EPRML system the output of the noisy partial response channel is sampled at the channel rate and detected using a maximum likelihood Viterbi detector.

Modulation codes are used to generate inputs to EPRML channels to increase detectability of the recorded bit sequences. With such codes, it is desirable to decrease the maximum number of consecutive zeroes and to maximize the minimum number of transitions per code word. Further, it is desirable to minimize the error propagation due to EPRML minimum distance channel errors.

Additionally, in order to achieve higher recording densities, it is desirable to have as efficient a code as possible. Generally, code efficiency is expressed in terms of a rate, which is the ratio of the number of input bits to be encoded to the number of output bits in the resulting code word. It is desirable to have the rate approach unity.

SUMMARY OF THE INVENTION

A first trellis code according to the present invention is a rate 24/26 trellis code with three (3) bytes error propagation due to EPRML minimum distance channel errors, a minimum of six (6) transitions per code word and a maximum of twelve (12) consecutive zeroes. A second trellis code according to the present invention is a rate 48/51 trellis code, derived from the first trellis code. The second trellis code has four (4) bytes error propagation due to EPRML minimum distance channel errors, a minimum of twelve (12) transitions per code word and a maximum of twelve (12) consecutive zeroes. A third trellis code according to the present invention is a rate 48/51 trellis code with four (4) bytes error propagation due to EPRML minimum distance channel errors, a minimum of fourteen (14) transitions per code word and a maximum of eleven (11) consecutive zeroes.

BRIEF DESCRIPTION OF THE DRAWINGS

A better understanding of the invention is obtained when the following detailed description is considered in conjunction with the following drawings in which:

FIGS. 3, 4A, 4B, and 5–8 characterize an exemplary trellis code according to the embodiment of FIGS. 2A and 2B;

FIGS. 11A, 11B, 12A, 12B and 13–14 characterize an exemplary trellis code according to another embodiment of the invention;

DETAILED DESCRIPTION OF THE INVENTION

Figure 1:
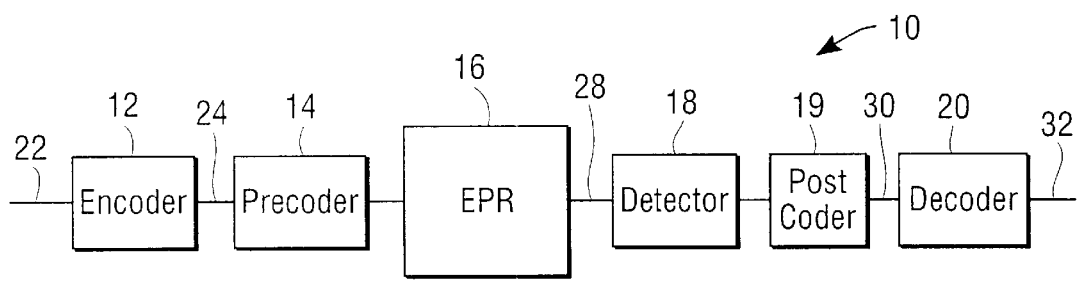
FIG. 1 is a diagram of an EPRML channel according to an embodiment of the invention.

Turning now to the drawings and with particular attention to FIG. 1, a block diagram illustrating an EPRML channel according to an embodiment of the invention is shown. The channel 10 includes an encoder 12 according to the present invention, a precoder 14, an EPR channel 16, a Viterbi detector 18, a postcoder 19, and a decoder 20. The encoder 20 produces one or more novel trellis codes according to the present invention, as will be explained in greater detail below.

A first trellis code according to the present invention is a rate 24/26 trellis code with three (3) bytes error propagation due to EPRML minimum distance channel errors, a minimum of six (6) transitions per code word and a maximum of twelve (12) consecutive zeroes. A second trellis code according to the present invention is a rate 48/51 trellis code, derived from the first trellis code. The second trellis code has four (4) bytes error propagation due to EPRML minimum distance channel errors, a minimum of twelve (12) transitions per code word and a maximum of twelve (12) consecutive zeroes. A third trellis code according to the present invention is a rate 48/51 trellis code with four (4) bytes error propagation due to EPRML minimum distance channel errors, a minimum of fourteen (14) transitions per code word and a maximum of eleven (11) consecutive zeroes.

As shown in FIG. 1, an input signal on a line 22 is transmitted to an input of an encoder 12. The encoder 12 produces an encoded output signal from the input signal, as will be explained in greater detail below. The output of the encoder 12 is coupled to the line 24 to provide the coded sequence to the precoder 14.

The precoder 14 has an input and an output and generates a precoded sequence based on the coded sequence. In particular, according to an embodiment of the present invention, the precoder 14 is defined by the transfer function $(1/1 \oplus DD \oplus D^2 \oplus D^3)$. The precoder 14 may be a finite state machine with input x, output y and state s, where at time n the following holds:

initial state  $S_{initial} = (state_1 state_2 state_3)$, where $state_k$, k=1,2, and 3, is the output of the pre-coder at time n-k,
output         $y = x + state_1 + state_2 + state_3 \pmod 2$, and
final state    $S_{final} = (y\ state_1 state_2)$.

The precoder 14 will be described further with regard to the particular embodiments. The output of the precoder 14 is coupled to the line 26 to provide the precoded sequence to the EPR channel 16. An output of the precoder 14 is also provided back to the encoder 12, as will be described in greater detail below.

A detector 18 receives the output of the EPR channel 16 along line 28. The detector 18 may be a Viterbi detector. The detector 18 provides the detected output along a line 30 to a postcoder 19, which essentially performs the inverse of the precoder 14. The output of the postcoder 19 is provided to the decoder 20. The decoder 20 performs the inverse of the encoder 12 and has several embodiments, each corresponding to an embodiment of the trellis code, as will be described below.

Figure 2A:
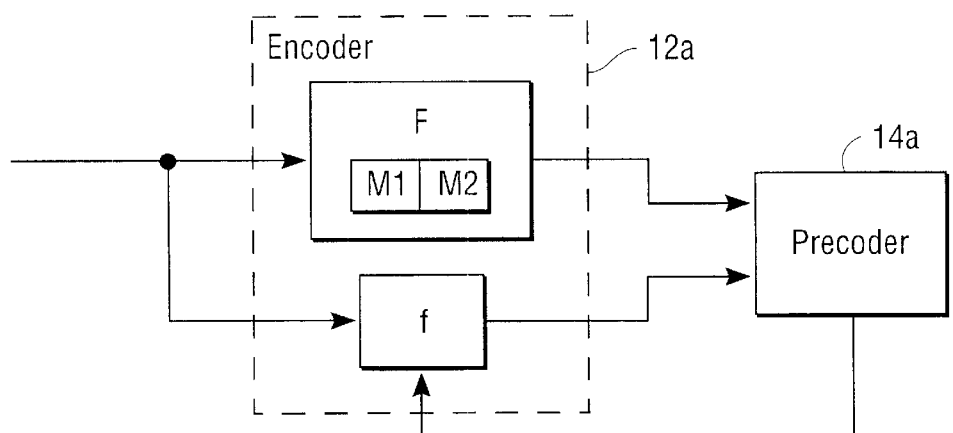
FIG. 2A is a block diagram of an exemplary encoder according to an embodiment of the invention.
Figure 2B:
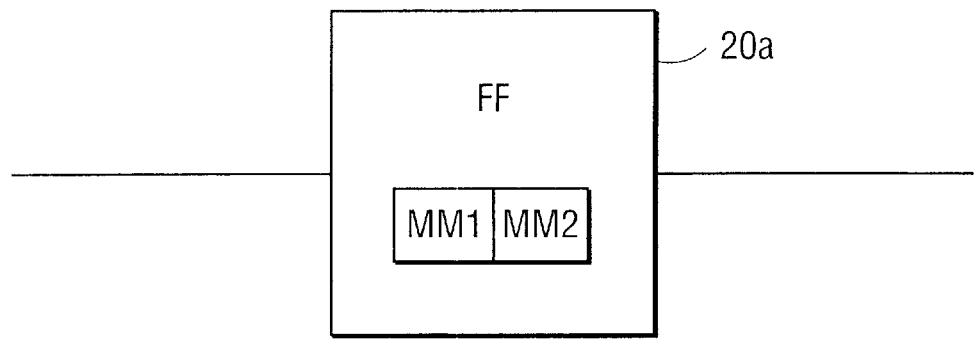
FIG. 2B is a block diagram of an exemplary decoder according to an embodiment of the invention.

As noted above, a first embodiment of the encoder implements a rate 24/26 trellis code with three (3) bytes error propagation due to EPRML minimum distance channel errors, a minimum of six (6) transitions per code word and a maximum of twelve (12) consecutive zeroes. A block diagram of an encoder 12A according to this embodiment is shown in FIG. 2A. In particular, as shown, the encoder 12A is characterized by a first map F and a second map f, as will be explained in greater detail below. Two maps M1 and M2 further characterize the map F, as will be explained in greater detail below. A decoder according to this embodiment is shown in FIG. 2B. The decoder 20A is characterized by a Map FF, which is further characterized by Maps MM1 and MM2, as will be explained in greater detail below.

The encoder 12A according to this embodiment may be implemented as a finite state machine that receives 24-bit data, $(a_1 1\ a_1 2 \ldots a_1 12)(a_2 1\ a_2 2 \ldots a_2 12)$, and outputs a 26-bit code-word, $(b_1 1\ b_1 2 \ldots b_1 12)\ e1\ (b_2 1\ b_2 2 \ldots b_2 12)\ e2$. It is noted that $a_1 1$ is the first bit received and $b_1 1$ is the first bit transmitted.

As noted above, the code-word is passed through a $(1/(1 \oplus D \oplus D^2 \oplus D^3))$ pre-coder. For this embodiment, the output of the pre-coder 14A has an even number of ones every 26 bits that span the image of a code-word. Specifically, if $(x_1\ x_2 \ldots x_{26}) = (b_1 1\ b_1 2 \ldots b_1 12)\ e1\ (b_2 1\ b_2 2 \ldots b_2 12)\ e2$ is input to the pre-coder having initial state $s_{initial} = (state_1\ state_2\ state_3)$, then $y_1 + y_2 + \ldots + y_{26} = 0\ \text{mod} 2$, where $y_k$ is the output of the pre-coder corresponding to the input $x_k$.

As noted above, the encoder 12A can be characterized by two maps F and f, where F: $(a_1 1\ a_1 2 \ldots a_1 12)(a_2 1\ a_2 2 \ldots a_2 12) ===> (b_1 1\ b_1 2 \ldots b_1 12)\ e1\ (b_2 1\ b_2 2 \ldots b_2 12)$, and f: $(a_1 1\ a_1 2 \ldots a_1 12)(a_2 1\ a_2 2 \ldots a_2 12) \times s_{initial} ===> e2$.

Also as noted above, the Map F may be described by two maps M1 and M2. The Map M1 maps 12 bits, a=(a1 - - - a12), to 11 bits, (b1 - - - b11). Next, several sets are defined which help to partition the domain of map M1:

(Let ′ to denote Complement
∧ to denote AND
∨ to denote OR
⊕ to denote EXCLUSIVE OR)

-continued

Let:
C1 = { (a1..a12): a2=a3, a4=a5, a6=a7 }           (has $2^9$ points)
C2 = { (a1..a12): a1=a2, a3=a4, a5=a6, a7=a8 }    (has $2^8$ points)
C3 = { (a1..a12): a2=a3 = a4 = a5 = a6 }          (has $2^8$ points)
C4 = { (a1..a12): a1+a2+..+a12 <=1 }              (has 12+1=13 points)
Let:
C= C1 ∪ C2 ∪ C3 ∪ C4
B1=C1 ∩ C4'
B2=C2 ∩ C1'∩ C4'
B3=C3 ∩ C1'∩ C2' ∩ C4'
B4=C4
B=B1 ∪ B2 ∪ B3 ∪ B4
G=B'
LEMMA 1 B=C.
LEMMA 2 Bi's are pair-wise disjoint.
Let:
V1={a2=a4, a6=a8}
V2={a1=1, a2=1, a4=a6}
V3={1 = a2 = a4 = a6 }
R1=V1
R2=V2 ∩ V1'
R3=V3 ∩ V2' ∩ V1'

The mapping for the Map M1 is shown in FIG. 3. In particular, the second to the left-most column defines the sets (i.e., the subset of M1) to which the bits a=(a1 . . . a12) belong (i.e., the sets define the partitioning of the map). The top row defines the eleven bits b=(b1 . . . b11) into which the twelve bits a=(a1 . . . a12) are to be mapped. The remainder of the table defines the particular mapping. For example, if the twelve bits a=(a1 . . . a12) belong to the set defined by G above, then the eleven bits (b1 . . . b11)=(a1 . . . a11). Similarly, if the twelve bits a=(a1 . . . a12) belong to the set defined by B2 above, then the bits are mapped into b=(b1 . . . b11)=(0, 1, 0, a2, a4, a6, a8, a9, a10, a11, a12).

The map M2 maps 12 bits, a=(a1 - - - a12), to 10 bits, (v1 - - - v10). Several sets are defined which help to partition the domain of map M2.

Let:
E1 = { (a1..a12): a4=a5, a6=a7, a8=a9 , a10=a11}     (has $2^8$ points)
E2 = { (a1..a12): a3=a4, a5=a6, a7=a8, a9=a10 }      (has $2^8$ points)
E3 = { (a1..a12): a4=a5 = a6 = a7 = a8=a9=a10 }      (has $2^6$ points)
E4 = { (a1..a12): a1+a2+..+a12 <=2 }                 (has 66+12+1=79 points)
E5 = { (a1..a12): a6+a7+a8+a9+a10+a11+a12=0 }
Let:
E= E1 ∪ E2 ∪ E3 ∪ E4
D1=E1 ∩ E4'
D2=E2 ∩ E1'∩ E4'
D3=E3 ∩ E1'∩ E2' ∩ E4'
D4=E4
D5=E5 ∩ E1'∩ E2' ∩ E3'∩ E4'
D=D1 ∪ D2 ∪ D3 ∪ D4 ∪ D5
GG=D'
LEMMA 1 E=D.
LEMMA 2 Di's are pair-wise disjoint.
Let:
T1={a1=1 a2=1   a3=a5 a7=a9}
T2={a2=a3  a5=a7 a9=a11}
T3={a1=a3  a7=a11)
T4={a1=0 a2=a3=a5=a7=a9=1 a11=0}

The actual mapping of the Map M2 is shown in FIG. 4A and FIG. 4B. For example, if the set a=(a1 . . . a12) belongs to the set GG, then the 10-bit set v=(v1 . . . v10) takes on the values (a3, a4, a5, a6, a7, a8, a9, a10, a11, a12).

To complete the encoder characterization it is necessary to define the maps F and f. Let's recall that F: $(a_1 1\ a_1 2 \ldots a_1 12)(a_2 1\ a_2 2 \ldots a_2 12) ===> (b_1 1\ b_1 2 \ldots b_1 12)\ e1\ (b_2 1\ b_2 2 \ldots b_2 12)$, and f: $(a_1 1\ a_1 2 \ldots a_1 12)(a_2 1\ a_2 2 \ldots a_2 12) \times s_{initial} ===> e2$.

The table of FIG. 7 completes the description of the Map F. For example, if A1 is in the set G and A2 is in the set GG, then $b_1 1 \ldots b_1 11$ is M1(A1);, $b_1 12$ is $a_1 12$; e1 is 1; $b_2 1$ is $a_2 1$; $b_2 2$ is $a_2 2$; and $b_2 3 b_2 4 \ldots b_2 12$ is M2(A2).

The following equation describes the Map f:

$$e2 = b_2 9 + b_2 5 + b_2 1 + b_1 10 + b_1 6 + b_1 2 + state_1 + state_2,$$

where $s_{initial} = (state_1\ state_2\ state_3)$.

Thus, the current code-word is passed through the pre-coder 14A and the final state of the pre-coder is the initial state for the computation of e2 of the next code-word.

The decoder 20A according to this embodiment is a block map, which inverts the encoder. The decoder 20A receives 26bits, $(b_1 1\ b_1 2 \ldots b_1 12)$ e1 $(b_2 1\ b_2 2 \ldots b_2 12)$ e2, and it outputs a 24 bit data, $(a_1 1\ a_1 2 \ldots a_1 12)(a_2 1\ a_2 2 \ldots a_2 12)$. As noted above, the decoder can be characterized by a map FF, where FF: $(b_1 1\ b_1 2 \ldots b_1 12)$ e1 $(b_2 1\ b_2 2 \ldots b_2 12)$ e2===>$(a_1 1\ a_1 2 \ldots a_1 12)(a_2 1\ a_2 2 \ldots a_2 12)$.

The Map MM1 is defined in FIG. 5 and maps eleven bits (b1 . . . 11) to twelve bits (a1 . . . a12). For example, if b2=1 and b3=1, then (a1 . . . a12)=(b1, b4, b4, b5, b5, b6, b6, b7, b8, b9, b10, b11).

The map MM2 maps 10 bits (v1 . . . v10) to twelve bits (a1 . . . a12). The map MM2 is shown in FIG. 6. For example, if v2=0 and v3=1, then (a1 . . . a12)=(v1, v4, v5, v6, v6, v7, v7, v8, v8, v9, v9, v10).

The table of FIG. 8 completes the characterization of the map FF. For example, if e1=1, then $(a_1 1\ a_1 2 \ldots a_1 10) = (b_1 1 b_1 2 \ldots b_1 10)$, $a_1 11 = b_1 11$, $a_1 12 = b_1 12$, $a_2 1 = b_2 1$, $a_2 2 = b_2 2$, and $(a_2 3 a_2 4 \ldots a_2 12) = (b_2 3 b_2 4 \ldots b_2 12)$.

Figure 9A:
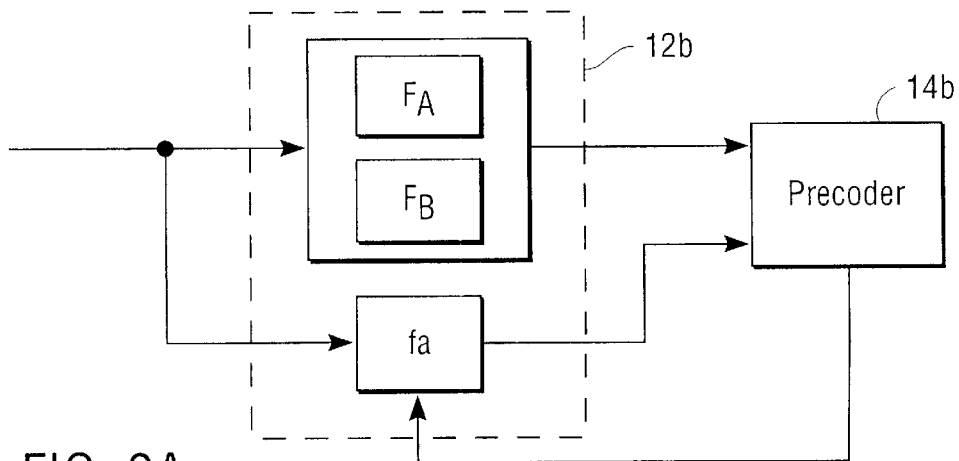
FIG. 9A is a block diagram of an exemplary encoder according to an embodiment of the invention.
Figure 9B:
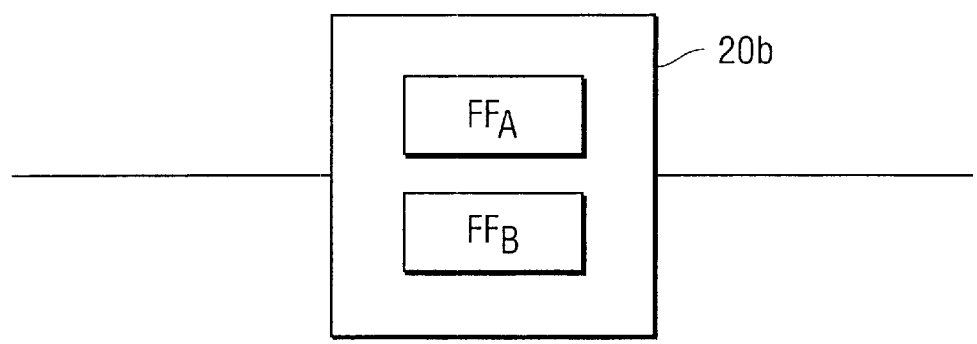
FIG. 9B is a block diagram of an exemplary decoder according to an embodiment of the invention.

A rate 48/51 trellis code according to a second embodiment of the invention may be generated from the 24/26 trellis code described above. In particular, the trellis code according to this embodiment has four (4) bytes error propagation due to EPRML minimum distance channel errors, a minimum of twelve (12) transitions per code word and a maximum of twelve (12) consecutive zeroes. FIG. 9A illustrates a block diagram of an encoder 12B according to this embodiment. The encoder 12B according to this embodiment includes a pair of Maps FA and FB, which are characterized similarly to the Map F described above. In addition, a Map fa is provided, as will be explained in greater detail below. A decoder 20B according to this embodiment is shown in FIG. 9B. As will be explained in greater detail below, the decoder 20B includes a pair of maps FFA and FFB, which are generally similar to the Map FF described above.

The encoder 12B according to this embodiment is characterized as follows:

$(a_1 1\ a_1 2 \ldots a_1 12)(a_2 1\ a_2 2 \ldots a_2 12)(a_3 1\ a_3 2 \ldots a_3 12)(a_4 1\ a_4 2 \ldots a_4 12)===>(b_1 1\ b_1 2 \ldots b_1 12)$ e1 $(b_2 1\ b_2 2 \ldots b_2 12)$ $(b_3 1\ b_3 2 \ldots b_3 12)$ e2 $(b_4 1\ b_4 2 \ldots b_4 12)$ e3, where
$(b_1 1\ b_1 2 \ldots b_1 12)$ e1 $(b_2 1\ b_2 2 \ldots b_2 12)$=FA $((a_1 1\ a_1 2 \ldots a_1 12)(a_2 1\ a_2 2 \ldots a_2 12))$,
$(b_3 1\ b_3 2 \ldots b_3 12)$ e2 $(b_4 1\ b_4 2 \ldots b_4 12)$=FB $((a_3 1\ a_3 2 \ldots a_3 12)(a_4 1\ a_4 2 \ldots a_4 12))$, where the Maps FA and FB are as described above with reference to the Map F.

The Map fa is described by the following equation:

$$e3 = b_4 9 + b_4 5 + b_4 1 + b_3 10 + b_3 6 + b_3 2 + b_2 10 + b_2 6 + b_2 2 + b_1 11 + b_1 7 + b_1 3 + state_1$$

Encoding for the first 25 code-word bits may begin after 24 data bits are received. Thus, it is not necessary to receive all 48 data bits to begin coding.

The decoder 20B according to this embodiment is characterized as follows:
$(b_1 1\ b_1 2 \ldots b_1 12)$ e1 $(b_2 1\ b_2 2 \ldots b_2 12)$ $(b_3 1\ b_3 2 \ldots b_3 12)$ e2 $(b_4 1\ b_4 2 \ldots b_4 12)$ e3===>$(a_1 1\ a_1 2 \ldots a_1 12)(a_2 1\ a_2 2 \ldots a_2 12)$ $(a_3 1\ a_3 2 \ldots a_3 12)(a_4 1\ a_4 2 \ldots a_4 12)$,
where
$(a_1 1\ a_1 2 \ldots a_1 12)(a_2 1\ a_2 2 \ldots a_2 12)$=FFA $((b_1 1\ b_1 2 \ldots b_1 12)$ e1 $(b_2 1\ b_2 2 \ldots b_2 12))$,
$(a_3 1\ a_3 2 \ldots a_3 12)(a_4 1\ a_4 2 \ldots a_4 12)$=FFB $((b_3 1\ b_3 2 \ldots b_3 12)$ e2 $(b_4 1\ b_4 2 \ldots b_4 12))$,
where the Maps FFA and FFB are as described above with reference to the Map FF (with e3 used for parity purposes in the Viterbi decoder).

Decoding for the first 24 data bits may begin after 25 code-word bits are received. Thus, it is not necessary to receive all 51 code word bits to begin decoding.

Finally, a 48/51 trellis code according to another embodiment of the invention is described. According to this embodiment, a rate 48/51 trellis code is provided, with four (4) bytes error propagation due to EPRML minimum distance channel errors, a minimum of fourteen (14) transitions per code word and a maximum of eleven (11) consecutive zeroes.

The code, TC, encoder is characterized as follows:
$(a_1 1\ a_1 2 \ldots a_1 12)(a_2 1\ a_2 2 \ldots a_2 12)$ $(a_3 1\ a_3 2 \ldots a_3 12)(a_4 1\ a_4 2 \ldots a_4 12)===>(b_1 1\ b_1 2 \ldots b_1 12)$ e1 $(b_2 1\ b_2 2 \ldots b_2 12)$ $(b_3 1\ b_3 2 \ldots b_3 12)$ e2 $(b_4 1\ b_4 2 \ldots b_4 12)$ e3, It is noted that $a_1 1$ is the first bit received and $b_1 1$ is the first bit transmitted. The pre-coder 14 according to this embodiment has an even number of ones (1) every 51 bits that span the image of a code-word. Specifically, if $$(x_1\ x_2 \ldots x_{51}) = (b_1 1\ b_1 2 \ldots b_1 12)\ e1\ (b_2 1\ b_2 2 \ldots b_2 12)\ (b_3 1\ b_3 2 \ldots b_3 12)\ e2\ (b_4 1\ b_4 2 \ldots b_4 12) e3$$

is input to the pre-coder 14 having initial state $s_{initial} = (state_1\ state_2\ state_3)$, then $y_1 + y_2 + \cdots + y_{51} = 0$ mod2, where $y_k$ is the output of the pre-coder corresponding to the input $x_k$.

Figure 10A:
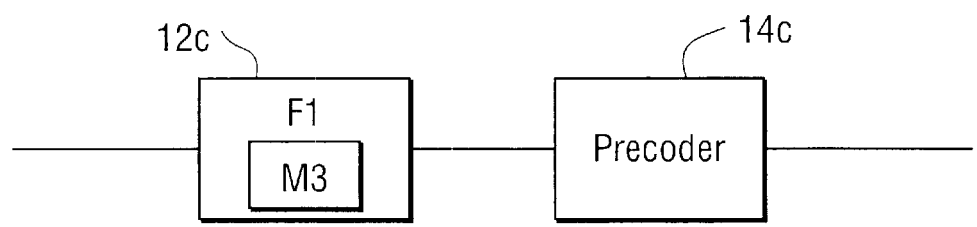
FIG. 10A is a block diagram of an exemplary encoder according to an embodiment of the invention.
Figure 10B:
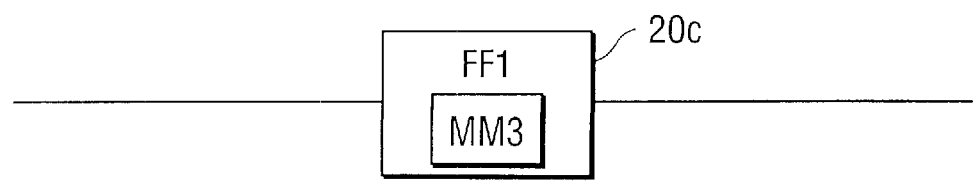
FIG. 10B is a block diagram of an exemplary decoder according to an embodiment of the invention.

First, we define a rate 24/25 code C, as shown in FIG. 10A and FIG. 10B. The encoder for the Code C includes an encoder 12C characterized by a Map F1, which is further characterized by a Map M3, as will be explained in greater detail below. The Code C decoder 20C (FIG. 10B), in turn, may be characterized by a Map FF1, which is further characterized by a Map MM3, as will also be explained in greater detail below.

The code C encoder 12C may be embodied as a finite state machine that receives 24-bit data, $(a_1 1\ a_1 2 \ldots a_1 12)(a_2 1\ a_2 2 \ldots a_2 12)$, and outputs a 25-bit code-word, $(b_1 1\ b_1 2 \ldots b_1 12)$ e1 $(b_2 1\ b_2 2 \ldots b_2 12)$.

As noted above, the encoder 12C can be characterized by a map F1, where F1: $(a_1 1\ a_1 2 \ldots a_1 12)(a_2 1\ a_2 2 \ldots a_2 12)===>(b_1 1\ b_1 2 \ldots b_1 12)$ e1 $(b_2 1\ b_2 2 \ldots b_2 12)$.

The decoder 20C can be characterized by a map FF1, where FF1: $(b_1 1\ b_1 2 \ldots b_1 12)$ e1 $(b_2 1\ b_2 2 \ldots b_2 12)===>(a_1 1\ a_1 2 \ldots a_1 12)(a_2 1\ a_2 2 \ldots a_2 12)$.

A map M3 is used to specify the map F1. The map M3 maps 12 bits, a=(a1 - - - a12), to 10 bits, (b1 - - - b10). Next we define several sets which help to partition the domain of map M3.

(Let ′ to denote Complement
∧ to denote AND
∨ to denote OR
⊕ to denote EXCLUSIVE OR)

-continued

Let:
C1 = { (a1..a12): a2=a3, a4=a5, a6=a7, a8=a9 }   (has $2^8$ points)
C2 = { (a1..a12): a3=a4, a5=a6, a7=a8, a9=a10 }  (has $2^8$ points)
C3 = { (a1..a12): a3 = a4 = a5 = a6 = a7 = a8 = a9 }  (has $2^6$ points)
C4 = { (a1..a12): a1+a2+..+a12 <=2 }  (has 66+12+1=79 points)
C5 = { (a1..a12): a1+a2+..+a6 =0} ∩ C1'∩ C2' ∩ C3' ∩ C4'
Let
C= C1 ∪ C2 ∪ C3 ∪ C4
B1=C1 ∩ C4'
B2=C2 ∩ C1'∩ C4'
B3=C3 ∩ C1'∩ C2' ∩ C4'
B4=C4
B5=C5
B=B1 ∪ B2 ∪ B3 ∪ B4 ∪ B5
G=B'
LEMMA 1 B=C.
LEMMA 2 Bi's are pair-wise disjoint.

Then, the Map M3 maps 12 bits into 10 bits as shown in the table of FIGS. 11A and 11B. Then, the table of FIG. 13 completes the characterization of the Map F1.

Figure 12B:
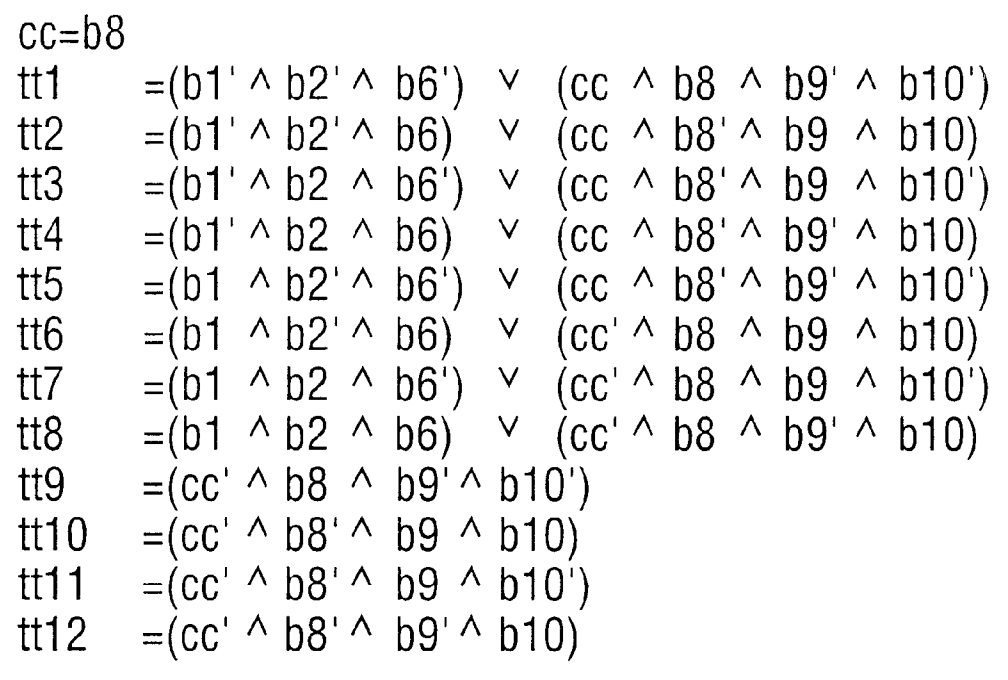

The Code C decoder 20C is a block map, which inverts the encoder. The decoder receives 25 bits, $(b_11\ b_12\ \ldots\ b_112)$ e1 $(b_21\ b_22\ \ldots\ b_212)$, and it outputs a 24 bit data, $(a_11\ a_12 \ldots a_112)(a_21\ a_22 \ldots a_212)$. The decoder can be characterized by a map FF1, where FF1: $(b_11\ b_12 \ldots b_112)$ e1 $(b_21\ b_22 \ldots b_212)$ ==> $(a_11\ a_12 \ldots a_112)(a_21\ a_22 \ldots a_212)$. A map MM3 is used to characterize the map FF1. The map MM is shown in FIGS. 12A and 12B. Finally, the table of FIG. 13 completes the characterization of the map FF1 from the map MM2.

Figure 15A:
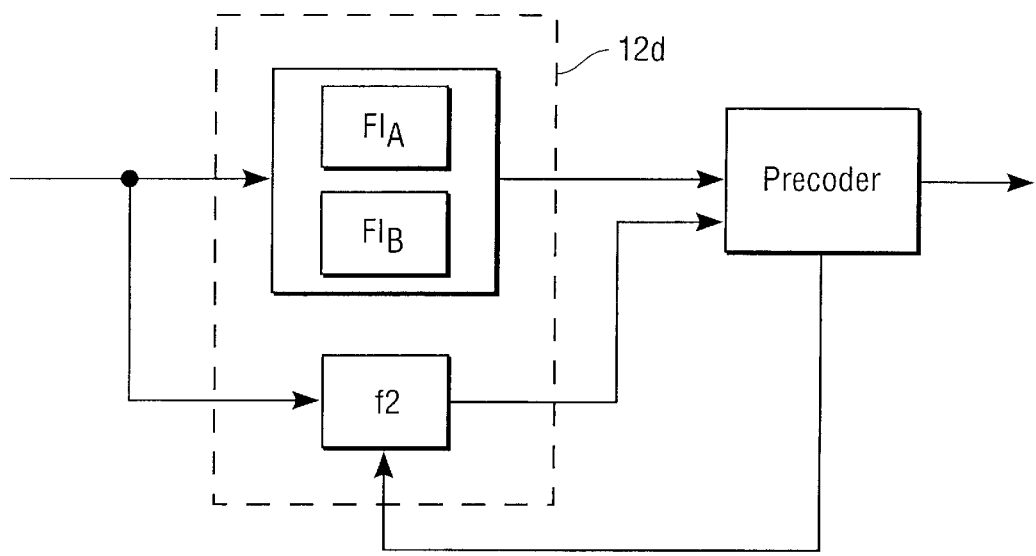
FIG. 15A is a block diagram of an exemplary encoder according to an embodiment of the invention.
Figure 15B:
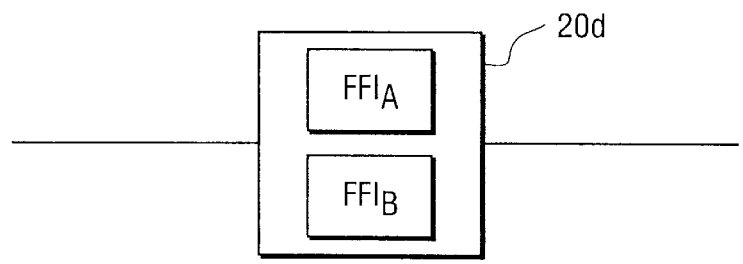
FIG. 15B is a block diagram of an exemplary decoder according to an embodiment of the invention.

The rate 24/25 code, C, described above is used to generate a trellis code, TC, having a rate 48/51. Block diagrams of a Code TC encoder and decoder are shown in FIG. 15A and FIG. 15B, respectively. In particular, the Code TC encoder 12D includes a pair of Maps F1A and F1B, similar to the Map F1 described above. In addition, a Map f2 is provided, which will be explained in greater detail below. Similarly, the decoder 20D is characterized by a pair of Maps FF1A and FF1B, similar to the Map FF1 described above.

The Code TC encoder is characterized as follows:
$(b_11\ b_12 \ldots b_112)$ e1 $(b_21\ b_22 \ldots b_212)$=F1A$((a_11\ a_12 \ldots a_112)(a_21\ a_22 \ldots a_212))$,
$(b_31\ b_32 \ldots b_312)$ e2 $(b_41\ b_42 \ldots b_412)$=F1B$((a_31\ a_32 \ldots a_312)(a_41\ a_42 \ldots a_412))$, and
where the maps F1A and F1B are as the Map F1 described above, and
e3=$b_49+b_45+b_41 +b_310+b_36+b_32+b_210+b_26+b_22+b_111+b_17+b_13$+state$_1$, mod 2

It is noted that it is not necessary to receive all forty-eight (48) data bits to start encoding. As soon as twenty-four (24) data bits are received, the first twenty-five (25) code-word bits may be encoded.

The Code TC decoder is characterized as follows:
$(b_11\ b_12 \ldots b_112)$ e1 $(b_21\ b_22 \ldots b_212)$ $(b_31\ b_32 \ldots b_312)$ e2 $(b_41\ b_42 \ldots b_412)$ e3===>$(a_11\ a_12 \ldots a_112)(a_21\ a_22 \ldots a_212)$ $(a_31\ a_32 \ldots a_312)(a_41\ a_42 \ldots a_412)$,
where
$(a_11\ a_12 \ldots a_112)(a_21\ a_22 \ldots a_212)$=FF1A$((b_11\ b_12 \ldots b_112)$ e1 $(b_21\ b_22 \ldots b_212))$,
$(a_31\ a_32 \ldots a_312)(a_41\ a_42 \ldots a_412)$=FF1B$((b_31\ b_32 \ldots b_312)$ e2 $(b_41\ b_42 \ldots b_412))$,
where the maps FF1A and FF1B are as the map FF1 described above (and with e3 used for parity purposes in the Viterbi decoder).

It is noted that it is not necessary to receive all fifty-one (51) bits to start decoding. After twenty-five (25) code-word bits are received, the first twenty-four (24) data bits may be decoded.

What is claimed is:

1. An extended partial response maximum likelihood (EPRML) channel, comprising:
    an encoder coupled to receive an input signal and implementing a rate 24/26 trellis code having three (3) bytes error propagation due to EPRML minimum distance channel errors;
    a precoder coupled to receive a coded signal from said encoder, perform a precoding operation on said coded signal;
    an extended partial response (EPR) channel coupled to receive an output from said precoder;
    a detector for detecting an output of said EPR channel; and
    a decoder coupled to receive an output of said detector for inverting said encoder.

2. An EPRML channel according to claim 1, wherein said encoder has a minimum of six (6) transitions per code word.

3. An EPRML channel according to claim 1, wherein said encoder has a maximum of twelve (12) consecutive zeroes.

4. An EPRML channel according to claim 1, wherein said encoder implements a rate 48/51 trellis code having four (4) bytes error propagation due to EPRML minimum distance channel errors using a concatenation of said rate 24/26 trellis code.

5. An EPRML channel according to claim 4, wherein said encoder has a minimum of twelve (12) transitions per code word.

6. An EPRML channel according to claim 4, wherein said encoder has a maximum of twelve (12) consecutive zeroes.

7. An extended partial response maximum likelihood (EPRML) channel, comprising:
    an encoder coupled to receive an input signal and implementing a rate 48/51 trellis code having four (4) bytes error propagation due to EPRML minimum distance channel errors;
    a precoder coupled to receive a coded signal from said encoder, perform a precoding operation on said coded signal;
    an extended partial response (EPR) channel coupled to receive an output from said precoder;
    a detector for detecting an output of said EPR channel; and
    a decoder coupled to receive an output of said detector for inverting said encoder.

8. An EPRML channel according to claim 7, wherein said encoder has a minimum of fourteen (14) transitions per code word.

9. An EPRML channel according to claim 7, wherein said encoder has a maximum of eleven (11) consecutive zeroes.

10. An extended partial response maximum likelihood (EPRML) channel, comprising:
    an encoder coupled to receive an input signal and implementing a trellis code including a partitioning into at least first and second maps;
    a precoder coupled to receive a coded signal from said encoder, perform a precoding operation on said coded signal;
    an extended partial response (EPR) channel coupled to receive an output from said precoder;
    a detector for detecting an output of said EPR channel; and
    a decoder coupled to receive an output of said detector for inverting said encoder.

* * * * *